United States Patent
Gandhi

(10) Patent No.: US 8,596,060 B2
(45) Date of Patent: Dec. 3, 2013

(54) SYSTEMS AND METHOD FOR PRODUCING MECHANICAL ENERGY

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 894 days.

(21) Appl. No.: 12/474,998

(22) Filed: May 29, 2009

(65) Prior Publication Data

US 2010/0300096 A1 Dec. 2, 2010

(51) Int. Cl.
*F01B 29/10* (2006.01)
*B60K 16/00* (2006.01)

(52) U.S. Cl.
USPC ................... 60/517; 60/641.8; 60/524

(58) Field of Classification Search
USPC ............... 60/517, 641.8–641.15, 524
See application file for complete search history.

(56) References Cited

U.S. PATENT DOCUMENTS

| | | | |
|---|---|---|---|
| 4,602,614 A * | 7/1986 | Percival et al. | 126/609 |
| 5,806,317 A * | 9/1998 | Kohler et al. | 60/659 |
| 5,904,748 A * | 5/1999 | Ehrensberger et al. | 75/367 |
| 5,958,761 A * | 9/1999 | Yogev et al. | 435/292.1 |
| 5,980,605 A * | 11/1999 | Yao et al. | 75/408 |
| 6,979,911 B2 | 12/2005 | Otting et al. | |
| 7,026,722 B1 | 4/2006 | Otting et al. | |
| 7,084,518 B2 | 8/2006 | Otting et al. | |
| 2005/0126624 A1 | 6/2005 | Pellizzari | |
| 2007/0157614 A1* | 7/2007 | Goldman | 60/641.15 |
| 2010/0212656 A1* | 8/2010 | Qiu et al. | 126/618 |

\* cited by examiner

*Primary Examiner* — Hoang Nguyen

(74) *Attorney, Agent, or Firm* — Christopher G. Darrow; Young Basile Hanlon & MacFarlane P.C.

(57) ABSTRACT

A system is provided for producing mechanical energy. The system may include a solar collector configured to receive solar energy and an external heater configured to provide secondary thermal energy. Furthermore, the system may include an engine disposed in communication with the solar collector and the external heater. To this end, the engine may be operable to receive the solar energy from the solar collector, receive the secondary thermal energy from the external heater, and convert the solar energy and the secondary thermal energy to mechanical energy. Additionally, the system may include a controller in communication with the solar collector, the engine, and the external heater. The controller may be configured to control an amount of solar energy and an amount of secondary thermal energy received by the engine.

20 Claims, 5 Drawing Sheets

SYSTEMS AND METHOD FOR PRODUCING MECHANICAL ENERGY

TECHNICAL FIELD

The present disclosure relates generally to the field of energy conversion, and more specifically, to Stirling engines.

BACKGROUND

A Stirling engine is a closed-cycle regenerative heat engine with gaseous working fluid that converts thermal energy into mechanical energy. The Stirling engine can be driven by any source of heat and may exhibit a relatively high thermal efficiency. In addition to its thermal efficiency, the Stirling engine has been noted for its quietness of operation and its ability to utilize wasted heat. Moreover, in contrast to internal combustion engines, the Stirling engine may have the potential to use renewable heat sources more easily than standard engines. The Stirling engine may also have a greater reliability than internal combustion engines and have lower maintenance requirements. As a result, the Stirling engine has been a focus within industries involved with developing energy saving methods.

Recently, there has been some interest in using solar energy to provide heat for the Stirling engine. In such configurations, a solar collector, coupled to the engine, may be employed to collector solar energy in order to heat a working fluid in the engine. A solar collector may typically include a dish to receive solar energy and to concentrate the solar energy onto the engine. Notably, as the operating temperature of a Stirling engine increases, its efficiency in converting thermal energy to mechanical energy may also increase. In contrast, however, the efficiency of a solar collector may decrease with an increase in operating temperature. Such a decrease in efficiency of the solar collector may significantly temper the increase in efficiency of the engine. Therefore, a balance in operating temperature may need to be achieved such that both the solar collector and the Stirling engine may operate at relatively high efficiencies. Furthermore, reducing the size of the solar collector may also be desired to increase practicality and functionality while reducing the weight and cost of a system. However, a relatively smaller solar collector may provide less solar energy, and consequently less heat to the Stirling engine, thereby reducing the engine's efficiency.

Thus, a need exists for systems and methods for providing secondary thermal energy to the Stirling engine in addition to solar energy in order to improve the efficiency of the engine.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure provides for a system for providing mechanical energy. The system may include a solar collector configured to receive solar energy and an external heater configured to provide secondary thermal energy. Furthermore, the system may include an engine disposed in communication with the solar collector and the external heater. To this end, the engine may be operable to receive the solar energy from the solar collector, receive the secondary thermal energy from the external heater, and convert the solar energy and the secondary thermal energy to mechanical energy. Additionally, the system may include a controller in communication with the solar collector, the engine, and the external heater. The controller may be configured to control an amount of solar energy and an amount of secondary thermal energy received by the engine.

Another aspect of the present disclosure provides for a system for converting thermal energy into mechanical energy. The system may include a solar collector configured to collect solar energy and an external heater configured to provide secondary thermal energy. Furthermore, the system may include an engine disposed in communication with the collector and the external heater. To this end, the engine may be operable to receive the solar energy and the secondary thermal energy to produce mechanical energy. Additionally, the solar collector may be configured to heat the engine to a first predetermined temperature.

A further aspect of the present disclosure provides for a method for producing mechanical energy with a Stirling Engine. The method may include receiving solar energy via a solar collector coupled to the Stirling Engine and receiving secondary thermal energy via an external heater coupled to the Stirling Engine. In addition, the method may include controlling an amount of solar energy and an amount of secondary thermal energy received and converting the solar energy and the secondary thermal energy into mechanical energy.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
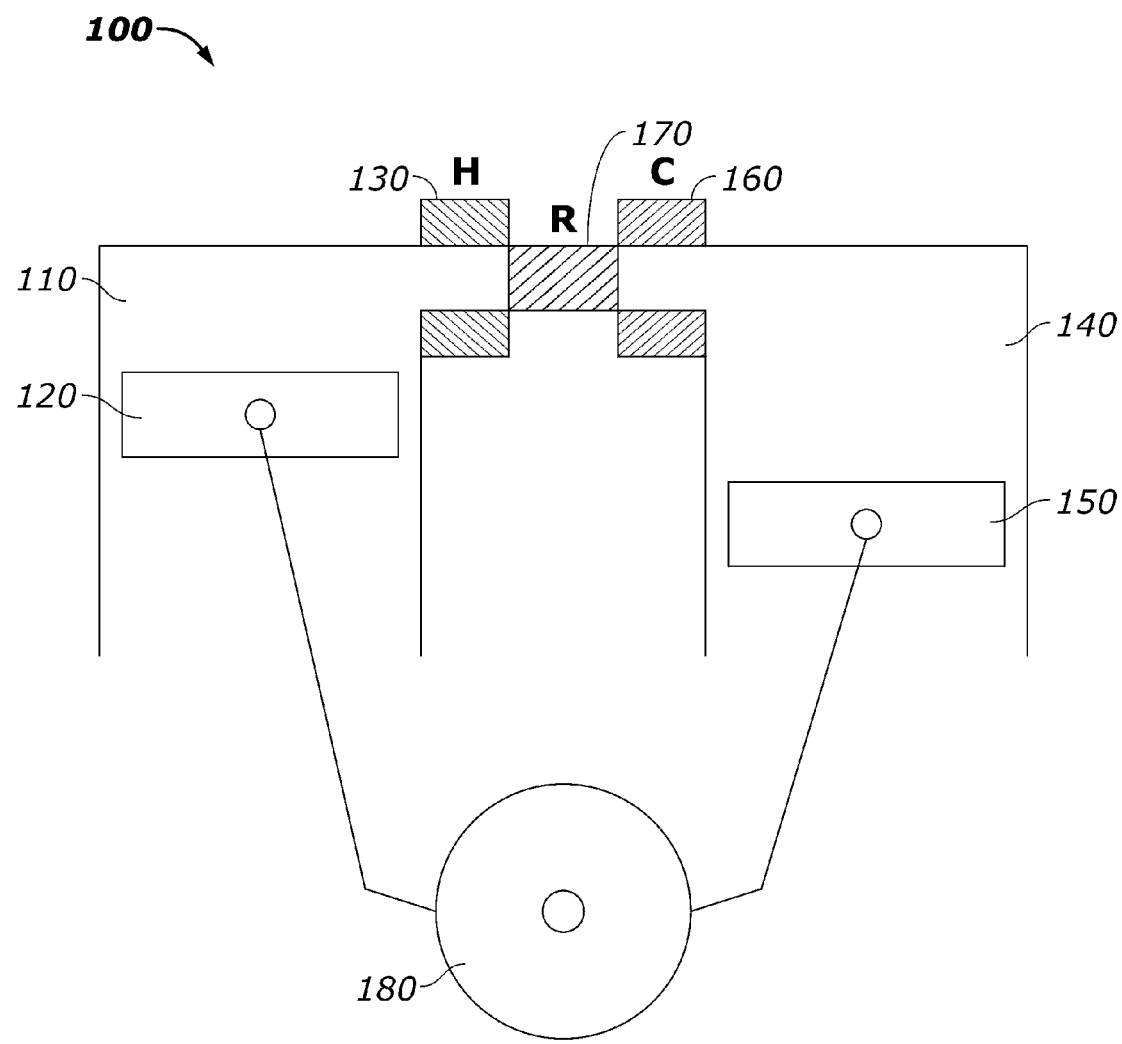
FIG. 1 represents a Stirling engine in accordance with one aspect of the present disclosure.

Before the present apparatuses are described, it is to be understood that this disclosure is not limited to the particular apparatuses described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "an," and "the" may include plural referents unless the context clearly dictates otherwise. Thus, for example, reference to "an external heater" refers to one or several external heaters and reference to "a method of producing mechanical energy" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

FIG. 1 represents a schematic of a Stirling engine in accordance with one aspect of the present disclosure. A Stirling engine may be an external combustion engine. In other words, in a Stirling engine, a working fluid within the engine may be heated from outside the engine. As the working fluid is heated, the Stirling engine may convert such heat into mechanical energy. The working fluid may typically be air, hydrogen, helium, or any other type of fluid. Thus, a Stirling engine may be a system that converts thermal energy into mechanical power by alternately compressing and expanding a fixed quantity of a working fluid at different temperatures. The Stirling Engine may therefore be referred to as a closed-cycle engine since the working fluid may be permanently contained within the Stirling engine's system. A more detailed description of the Stirling engine will now ensue in reference to FIG. 1.

The Stirling engine 100 may include a heated container 110 and a power piston 120 disposed within the heated container 110. The working fluid (not illustrated) may be heated within the heated container 110 via any heat source 130. The heat source 130 may be derived from any suitable source of heat including, but not limited to, solar energy, combustion of a fuel such as gas, and/or even combustion of materials that would otherwise be considered waste such as agricultural waste and domestic refuse.

The Sterling engine 100 may also include a cooled container 140 and a cool piston 150 disposed within the cooled container 140. In the cooled container 140, the working fluid may be cooled by a cooler 160 or may even be air cooled. In one implementation, the cooler 160 may include a plumbing system where a coolant may be driven through various tubes to a radiator (not shown) coupled to the Stirling engine 100. It should be noted that the cooler 160 is not limited to such an implementation and that any method of cooling the cooled container 140 is contemplated within the present disclosure.

When the working fluid is heated in the heated container 110, the working fluid may expand, thereby pushing on the power piston 120. As illustrated in FIG. 1, the expansion of the working fluid may push the power piston 120 in a downward direction. It should be understood that the power piston 120 is not limited to movement in a downward direction. For example, if the Stirling engine were constructed or placed in a different orientation, movement of the power piston may occur in a different direction. During expansion, some of the heated working fluid may flow to the cooled container 140. Such expansion may even cause a push on the cool piston 150 in the cooled container 150 in a downward direction. In a typical Stirling engine, movement of the cool piston 150 may occur ninety degrees out of phase from the power piston 120. In this manner, the heating of the working fluid may cause work to be performed with the movement of the power piston 120 and the cool piston 150. Consequently, the thermal energy used to heat the working fluid may be converted into the mechanical energy of the movement of the pistons.

Additionally, the Stirling engine 100 may exhibit regenerative capabilities to form an operating cycle. For example, once the power piston 120 has completed its downward movement, caused by the expansion of the working fluid, momentum from the flywheel 180 may then push the power piston 120 back in an upward direction, thereby compressing the working fluid in the heated container 110. The working fluid may then pass through the regenerator 170 into the cooled container 140 where the working fluid is cooled by the cooler 160. As such, the regenerator 170 may be a device configured to transfer the working fluid between the heated container 110 and the cooled container 140 at a relatively high thermal efficiency. The regenerator may be able to provide a relatively high efficiency of about 90% or more.

As the working fluid is cooled in the cooled container 140, the cool piston 150 may begin to move back in an upward direction and compress the working fluid. The compression may initiate the working fluid to flow back toward the heated container 110. The cycle may then repeat itself as the working fluid may be heated in the heated container 110, expand in the heated container 110, and subsequently push on the power piston 120.

Furthermore, Stirling engines may prove advantageous over other engines in that they may operate at a high thermal efficiency. Moreover, in Stirling engines, various types of alternative energies may be effectively used as a heat source for heating the working liquid. For example, solar energy, geothermal energy, and/or exhaust heat can be used as a heat source. In addition, Stirling engines may be constructed to operate on low temperature differences, e.g., the temperature difference between room temperature and an ice cube.

In addition, there may typically exist various types of Stirling engines currently used. As such, the Stirling engine illustrated in FIG. 1 may be referred to as an alpha Stirling. As has been described in detail, an alpha Stirling may contain two power pistons in separate cylinders or containers. A first container may store the working fluid when it is heated, and a second container may store the working fluid while it is being cooled. Notably, the alpha Stirling may exhibit a high power-to-volume ratio but may also possess technical problems due to the typically high temperature of the hot piston and the durability of its seals. In practice, the hot piston may carry a large insulating head to move the seals away from the hot zone at the expense of some additional dead space, thereby sacrificing some efficiency.

Additionally, another type of Stirling engine may include the beta Stirling (not illustrated). In the beta Stirling, a single power piston may be arranged within the same cylinder on the same shaft as a displacer piston. The displacer piston may be a loose fit and may not extract any power from the expanding gas but instead may shuttle the working gas from a hot heat exchanger to a cold heat exchanger. When the working gas is pushed to the hot end of the cylinder it may expand and push the power piston. When the power piston is pushed to the cold end of the cylinder, it may contract, and the momentum of the machine, typically enhanced by a flywheel, may push the power piston in the other direction to compress the gas. In contrast to the alpha Stirling, the beta Stirling may avoid the technical problems of hot moving seals.

Figure 2:
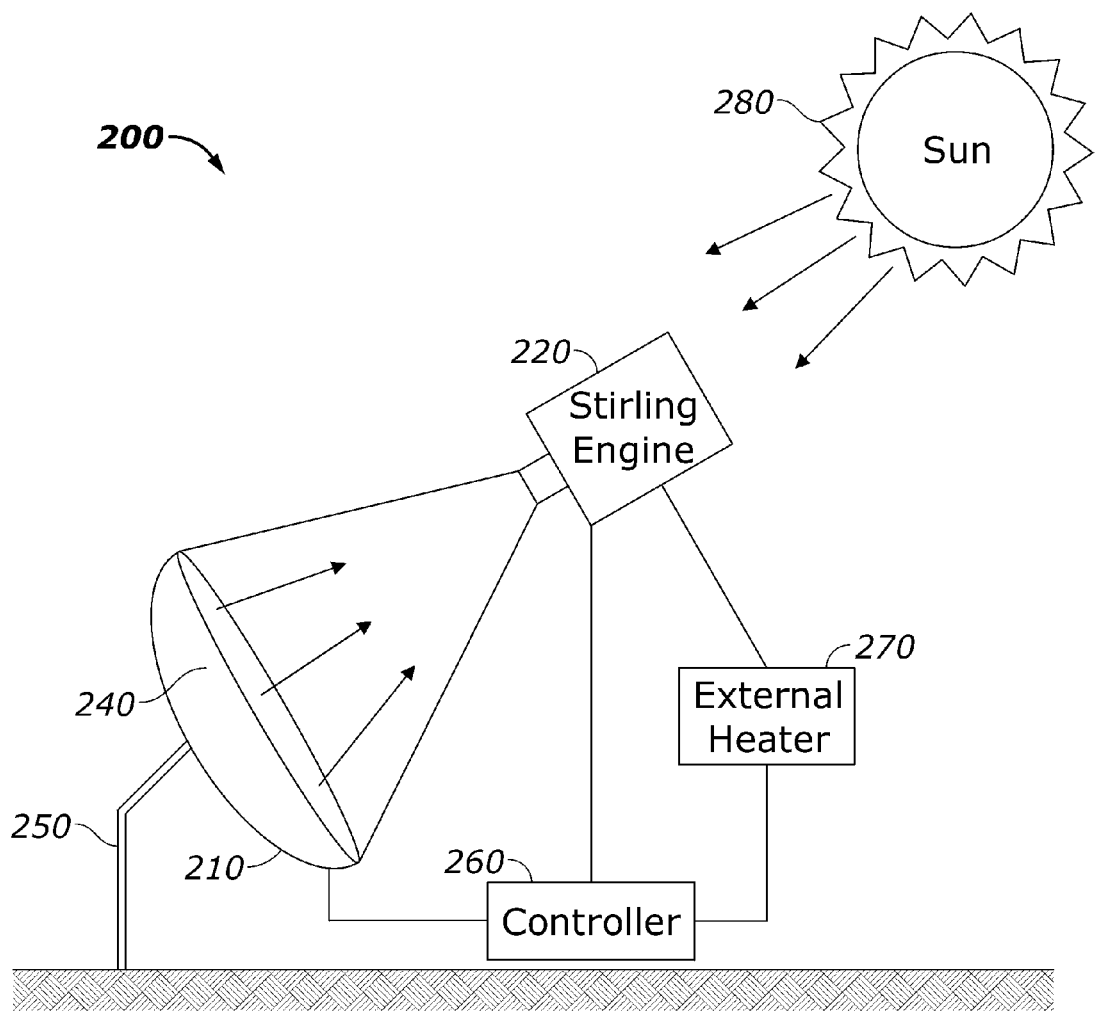
FIG. 2 represents a system for converting thermal energy into mechanical energy in accordance with one aspect of the present invention.

Turning now to FIG. 2, a schematic representing a system for converting thermal energy into mechanical energy may be provided in accordance with one aspect of the present invention. The system 200 may include a solar collector 210 configured to receive solar energy from the sun 280. Furthermore, the solar collector may include a concave dish or mirror 240 to receive the solar energy and focus the solar energy on a particular point. In one implementation, the concave dish

240 may be configured to focus solar energy on a Stirling engine 220, thereby providing thermal energy to power the Stirling engine 220.

Additionally, the solar collector 210 may also include a mobile stand 250 configured to allow adjustment of the position of the solar collector. As such, the position of the solar collector 210 may be adjusted according to various conditions, such as the time of day, for example, in order to maintain a relatively high efficiency in the collection of solar energy. For instance, the time of day may reflect the position of a particular point on earth relative to the sun as the earth rotates. Therefore, depending on the time of day, the most efficient position for the solar collector 210 to collect solar energy may change. The mobile stand 250 may thus enable the solar collector 210 to make any adjustments in its position and/or orientation to improve the efficiency of solar energy collection.

Notably, however, as the temperature of the concave dish 240 in the solar collector 210 increases, the overall efficiency of the solar collector 210 may decrease. In other words, as the operating temperature of the solar collector 210 increases, a greater percentage of solar energy may be lost to the environment, thereby reducing the efficiency of the solar collector 210. In contrast, the Stirling engine 220 may function at an increased efficiency as its operating temperature increases. Typically, the Stirling engine efficiency may peak when it is operated in the range of about 800 degrees Celsius to 1000 degrees Celsius. Furthermore, in order to heat the Stirling engine to within such a temperature range, a relatively large solar collector 210 may be needed, which may not be practical. Thus, a tradeoff may exist between the desire to limit the operating temperature and size of the solar collector 210 and the benefits of increasing the operating temperature of the Stirling engine 220.

Thus, the system 200 may also include an external heater 270 to provide secondary thermal energy to the Stirling engine 220 in addition to the solar energy provided by the solar collector 110. To this end, the external heater 270 may provide secondary thermal energy through the combustion of any fuel. For example, in one implementation, the external heater 270 may be a gas burner. In other implementations, the external heater 270 may include, but is not limited to, oil burners, coal burners, waste material burners, and/or electric heaters. As a result, any heat not provided to the Stirling engine 220 by the solar collector 210 may be provided by the external heater 270. Therefore, the operating temperature of the concave dish 240 may be kept relatively lower, while the Stirling engine 220 may be maintained at a relatively higher operating temperature via the addition of the secondary thermal energy provided by the external heater 270. Consequently, both the solar collector 210 and the Stirling engine 220 may be able to operate at a relatively higher efficiency when using the external heater 270 in combination with the solar collector 210 to provide heat, as compared to using only the solar collector 210.

As such, to regulate or control the amount of solar energy provided by the solar collector 210 and the amount of secondary thermal energy provided by the external heater 270, a controller 260 may be coupled to the solar collector 210, the Stirling engine 220, and the external heater 270. The controller 260 may be configured to sense or monitor the operating temperature of both the solar collector 210 and the Stirling engine 220. Furthermore, the controller 260 may also be able to adjust the position of the concave dish 240 of the solar collector 210 as well as switch the external heater 270 between an ON state and an OFF state. Thus, the controller 260 may be operable to control the amount of heat provided to the Stirling engine 220 by the solar collector 210 and the external heater 270, respectively, in order to maintain relatively high operating efficiencies for both the solar collector 210 and the Stirling engine 220.

To this end, the controller may enable the solar collector 210 to heat the Stirling engine 220 to a first predetermined temperature. Furthermore, the first predetermined temperature may be the highest temperature at which the operating temperature of the Stirling engine 220 may be maintained at a relatively steady state while receiving the solar energy. In one implementation, the first predetermined temperature may be approximately in the range of about 600 degrees Celsius to 800 degrees Celsius. Additionally, while the solar collector 210 may be providing solar energy to heat the Stirling engine but operating at a temperature below the first predetermined temperature, the controller 260 may maintain the external heater 270 in an OFF state.

Once the Sterling engine 220 has been heated to the first predetermined temperature, the controller 260 may then switch the external heater 270 to an ON state. Thereafter, the controller 260 may be configured to maintain the solar collector 210 at the first predetermined temperature while using the external heater 270 to heat the Stirling engine 220 from the first predetermined temperature to a second predetermined temperature. To this end, the second predetermined temperature may be greater than the first predetermined temperature, and in one implementation, may be approximately in the range of 800 degrees Celsius to 1000 degrees Celsius. Additionally, in one implementation, the operating temperature of the solar collector 210 may be controlled by an external cooler such as pumped water lines, for example.

Notably, in order to improve the practicality of using solar collectors, reducing the size of the solar collector 210 may be desirable. Without the external heater 270, however, the amount of solar energy and therefore heat provided to the Stirling engine 220 may significantly decrease with a reduction in the size of the solar collector 210. Thus, the Stirling engine 220 may be forced to operate at a lower temperature, thereby decreasing its operating efficiency. With the addition of the external heater 270, however, the Stirling engine 220 may be heated to relatively higher temperatures even while decreasing the size of the solar collector 210. In other words, less heat to the Stirling engine 220 may be required from the solar collector 210, which may enable one to reduce both the size of the solar collector 210 and its operating temperature. Therefore, the operating temperature of the solar collector 210 may be limited to the first predetermined temperature, which may be lower than it would have been previously without the external heater 270. Conversely, the Stirling engine 220 may be heated to a higher second predetermined temperature. Thus, the efficiencies of both the solar collector 210 and the Stirling engine 220 may be increased, thereby increasing the efficiency of the overall system 200. Moreover, the size of the solar collector 210 may be reduced.

Furthermore, the first predetermined temperature may change or be adjusted depending on the amount of solar energy available. To this end, the controller 260 may be further capable of detecting the amount of solar energy available and adjusting the first predetermined temperature accordingly. For example, if weather conditions permit only a relatively low amount of sunlight on a given day, the first predetermined temperature may be lowered, and the controller 260 may switch the external heater 270 to an ON state at a lower temperature than if more sunlight were available. In this capacity, the external heater 270 may also serve as a form of backup heat for the system 200.

Figure 3:
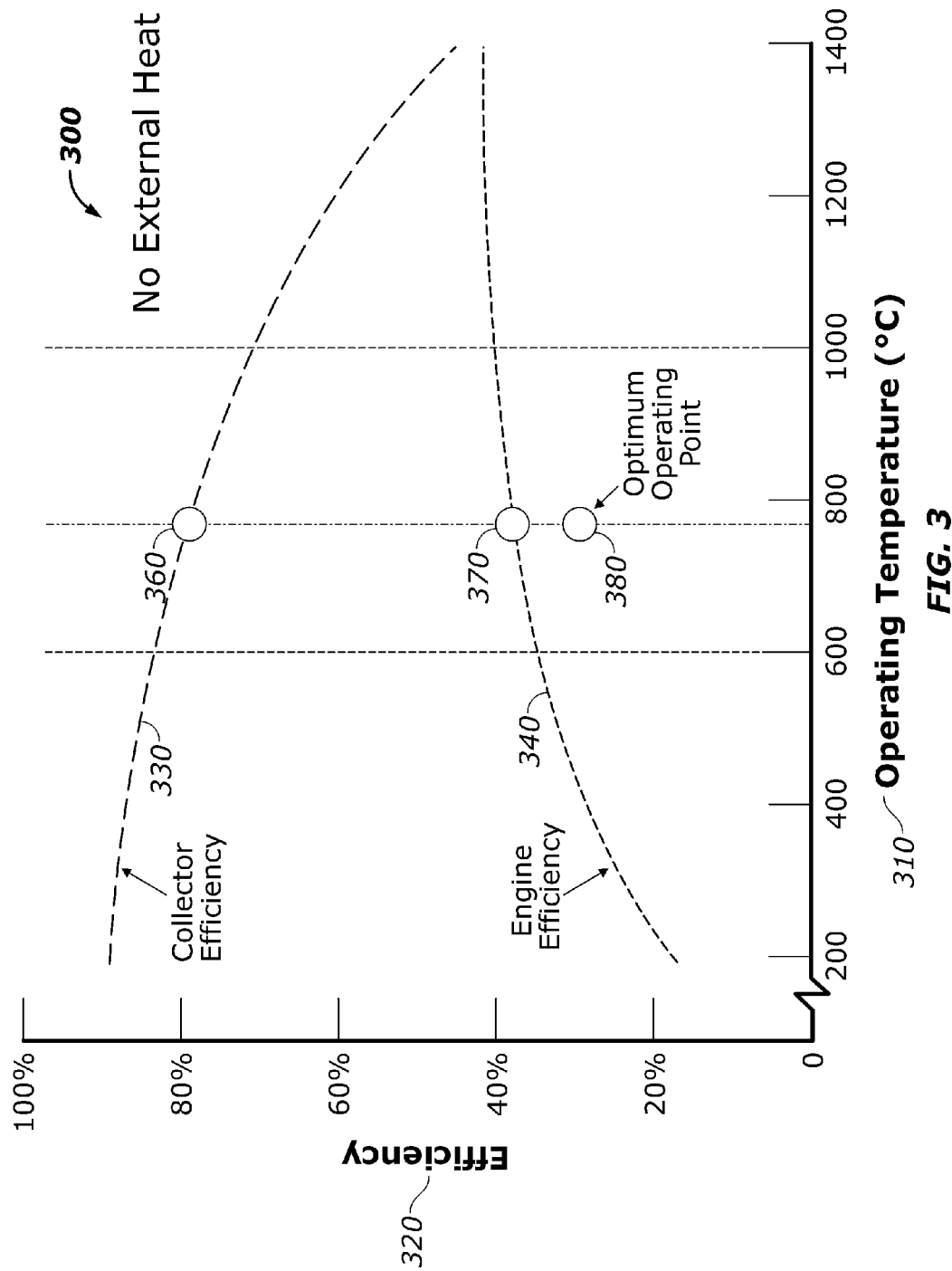
FIG. 3 provides a graph illustrating the operating efficiencies of a solar collector and a Stirling Engine without providing external heat to the Stirling engine.

Turning now to FIG. 3, a graph 300 may be provided that illustrates the operating efficiencies of a solar collector and a Stirling Engine without providing external heat to the Stirling engine. As shown, the graph may depict efficiency 320 on the y-axis as a function of operating temperature 310 in degrees Celsius on the x-axis. In general, the efficiency of a given system may refer to how much energy is retained, i.e., not lost, as a result of the operation of the system. For instance, the efficiency of the solar collector may refer to the ratio of the solar energy received by the solar collector to the solar energy received by the Stirling engine. Similarly, the efficiency of the Stirling engine may refer to the ratio of thermal energy received to the mechanical energy produced. To this end, the combined efficiency may refer to the ratio of solar energy received by the solar collector to the mechanical energy produced by the Stirling engine.

As depicted in FIG. 3, the solar collector efficiency curve 330 may decrease as its operating temperature 310 increases. On the other hand, the Stirling Engine efficiency curve 340 may generally increase with an increase in the operating temperature 310 of Stirling engine. Notably, if the solar collector provides the sole source of thermal energy to the Stirling engine, the operating temperatures of both components may be relatively similar at a given point in time. As previously mentioned, a tradeoff may therefore exist between decreasing the operating temperature of the solar collector to increase the collector's efficiency and increasing the operating temperature of the Stirling engine to increase the engine's efficiency. Thus, because such a tradeoff may exist, the optimum operating temperature in one implementation may be about 800 degrees Celsius, which may sacrifice some efficiency in both the solar collector and the Stirling engine. As displayed by the solar collector efficiency curve 330 and the Stirling engine efficiency curve 340, an operating temperature of about 800 degrees Celsius may produce a solar collector efficiency 360 below 80% and a Stirling engine efficiency 370 below 40%. Furthermore, the combined efficiency 380 from such an operating temperature may be about 30%-32%. As a result, the tradeoff may prevent the solar collector and the Stirling engine from operating at relatively higher efficiencies.

Figure 4:
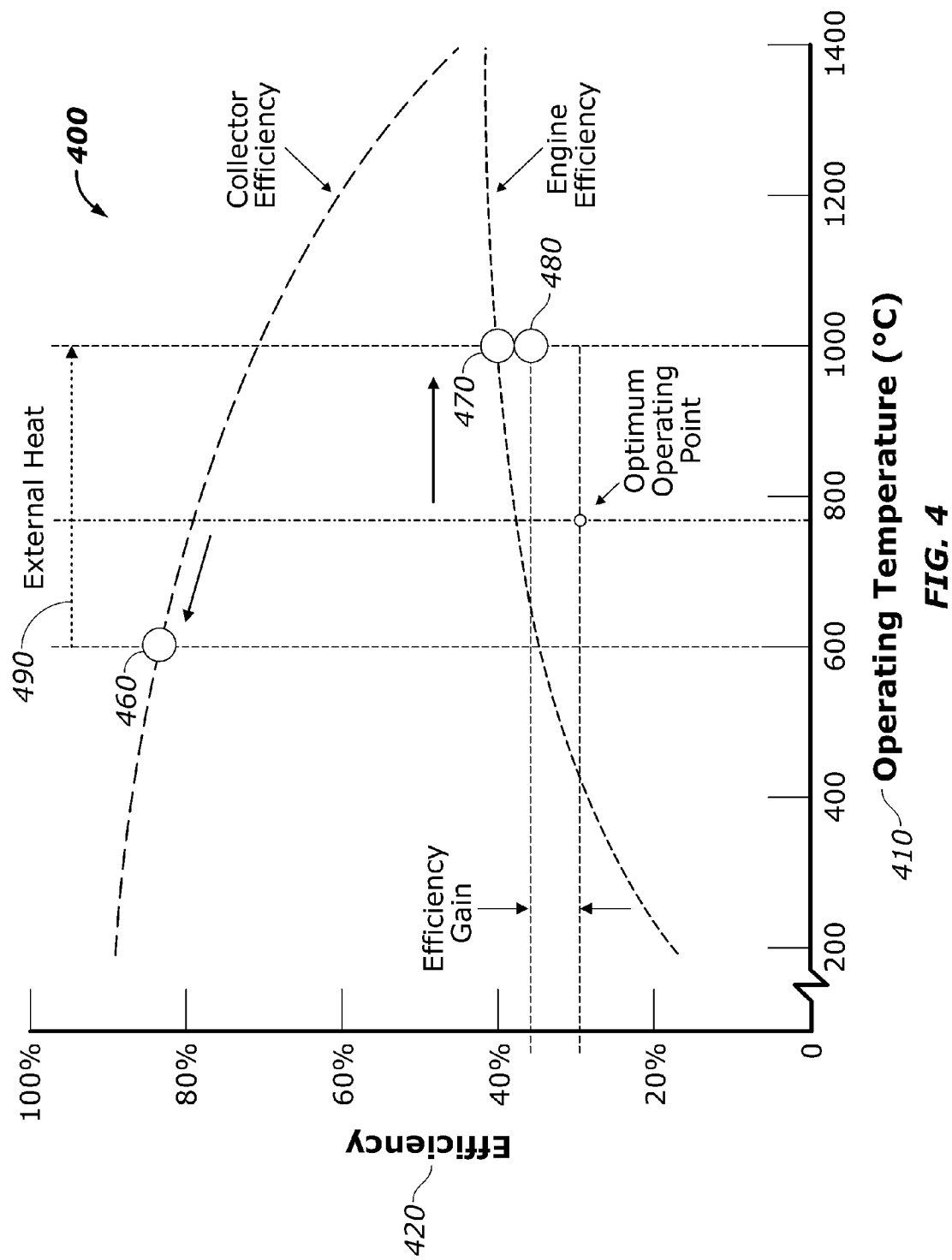
FIG. 4 provides a graph illustrating the operating efficiencies of a solar collector and a Stirling Engine with the addition of external heat provided to the Stirling engine.

FIG. 4 depicts a graph 400 that illustrates the operating efficiencies of a solar collector and a Stirling Engine with the addition of external heat provided to the Stirling engine. Similar to FIG. 3, the graph 400 depicts efficiency 420 on the y-axis as a function of operating temperature 410 on the x-axis. Notably here, however, the solar collector may not provide the sole source of thermal energy for the Stirling engine. Instead, the solar collector may only heat the Stirling engine to a first predetermined temperature. In one implementation, the first predetermined temperature may be about 600 degrees Celsius. The external heat 490 may then be employed to heat the Stirling engine from the first predetermined temperature to a second predetermined temperature. In one implementation, the second predetermined temperature may be about 1000 degrees Celsius.

Thus, the operating temperature of the solar collector may be reduced, thereby increasing its efficiency of its operation. Indeed, as compared with FIG. 3, where the solar collector provides the sole source of thermal energy to the Stirling engine at an optimum operating temperature of about 800 degrees Celsius, the solar collector in FIG. 4 may instead be able to operate at a relatively lower temperature, e.g., approximately 200 degrees Celsius cooler. As a result, in one implementation, the solar collector's efficiency 460 may experience an increase of about 10%.

Furthermore, with the addition of the external heat 490, the operating temperature of the Stirling engine may be increased, thereby also increasing the operating efficiency of the Stirling engine. In one implementation, and as shown in FIG. 4, the Stirling engine may be able to operate at a temperature of about 1000 degrees Celsius, i.e., the external heat 490 produced by the external heater may heat the Stirling engine from about 600 degrees Celsius to about 1000 degrees Celsius. Such an increase in operating temperature may have a corresponding increase in the efficiency 440 of the Stirling engine of about 5%. Moreover, the overall combined efficiency 480 of the system may experience an efficiency gain of about 6%-10%.

It should be noted that the present disclosure is not limited to the specific temperatures and percentages provided in FIG. 3 and FIG. 4. A combination of a solar collector, Stirling engine, and/or an external heater may be tuned to have many different optimum operating temperatures than those provided by the above figures. Similarly, the corresponding efficiencies of each component may also significantly differ depending on the optimum operating temperatures. FIG. 3 and FIG. 4 merely illustrate that using external heat to provide a secondary thermal energy source in addition to the solar energy from the solar collector may enable the solar collector operate at a relatively lower temperature. Moreover, the external heat may enable the Stirling engine to operate at a relatively higher temperature. As a result, both the solar collector and the Stirling engine may operate with a relatively higher efficiency, thereby increasing the efficiency of the overall system. Furthermore, using an external heater may also enable reducing the size of the solar collector, thereby reducing costs and weight to the system.

Figure 5:
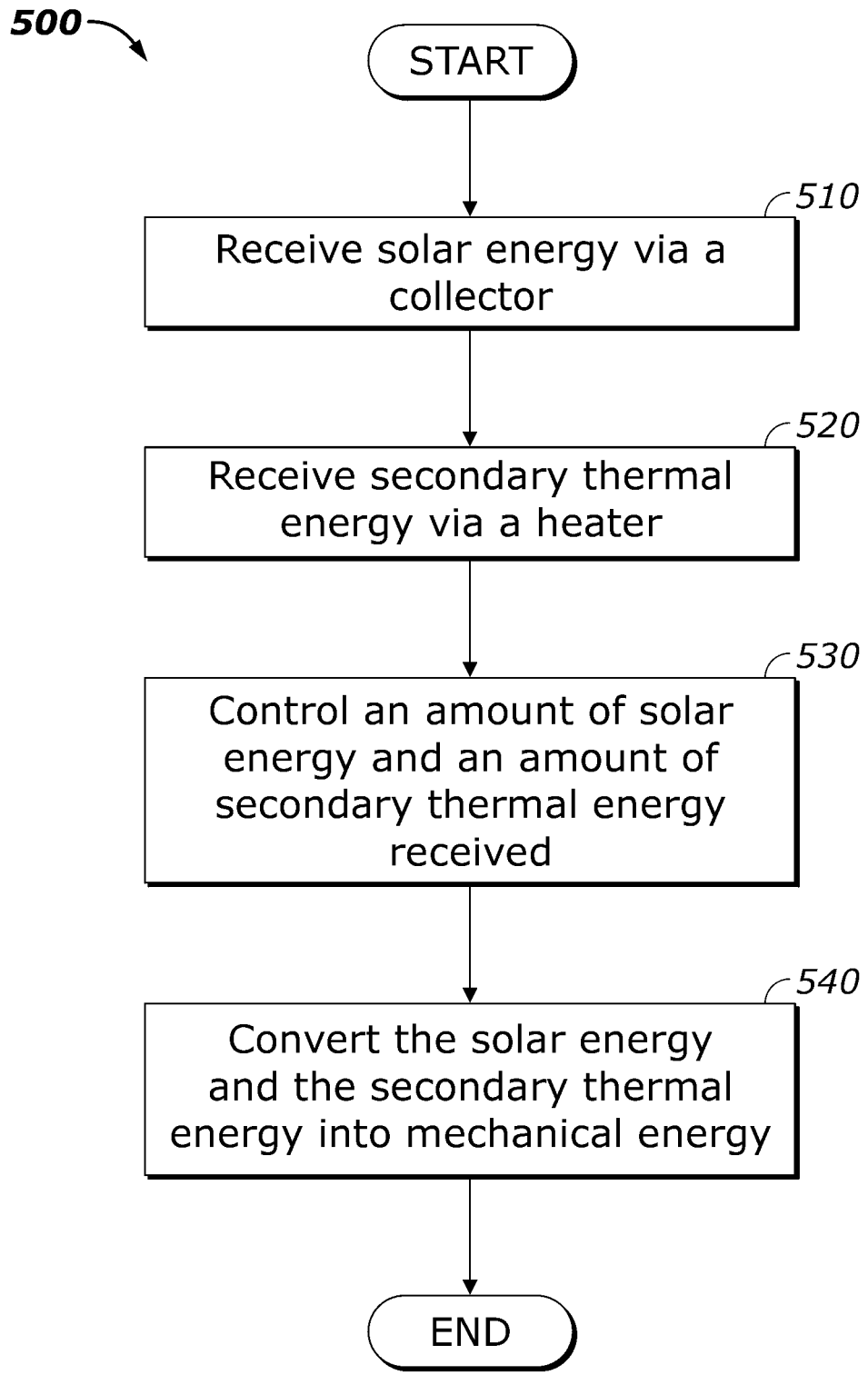
FIG. 5 provides a flow diagram that illustrates a method for producing mechanical energy with a Stirling engine in accordance with one aspect of the present disclosure.

Turning now to FIG. 5, a flow diagram is provided that illustrates a method 500 for producing mechanical energy with a Stirling engine in accordance with one aspect of the present disclosure. The method may begin in step 510 where solar energy is received via a solar collector. As previously explained, the solar collector may include a concave dish to received solar energy and direct the solar energy at the Stirling engine. Next, in step 520, secondary thermal energy may be received via an external heater. The external heater may provide the secondary thermal energy via combustion of an external fuel, such as gas, for example. As such, in one implementation, the external heater may be a gas burner.

The method 500 may also include controlling an amount of solar energy and an amount of secondary thermal energy received by the Stirling engine in step 530. As previously mentioned throughout the present disclosure, the efficiency of the solar collector may decrease with an increase in its operating temperature while the efficiency of the Stirling engine may increase with an increase in its operating temperature. Additionally, reducing the size of the solar collector may decrease the amount of solar energy, and therefore heat, it can provide to the Stirling engine. Therefore, in one implementation, the solar collector may provide solar energy to heat the Stirling engine to a first predetermined level. To this end, the first predetermined level may be the highest temperature at which the operating temperature of the Stirling engine can be maintained at a relatively steady state. In one implementation, the first predetermined level may be in a range of about 600 degrees Celsius to 800 degrees Celsius. Once the Stirling engine has reached an operating temperature at the first predetermined level, a controller may switch the external heater to an ON state to heat the Stirling engine from the first predetermined level to a second predetermined level. Furthermore, the controller may be operable to maintain the operating temperature at the first predetermined level.

In step 540, the solar energy and the secondary thermal energy may be converted into mechanical energy via the Stirling engine. The method by which the Stirling engine may perform such a conversion has been previously described with reference to FIG. 1.

Thus, the present disclosure provides for systems and a method for converting thermal energy in to mechanical energy. More particularly, a Sterling engine in combination with a solar collector and an external heater may be employed. As such, the solar collector may heat the Stirling engine to a first predetermined level, and the external heater may heat the Stirling engine from the first predetermined level to the second predetermined level. Thus, the operating temperature of the solar collector may be kept relatively low while the operating temperature of the Stirling engine may be kept relatively high.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A system for providing mechanical energy, the system comprising:
   a solar collector operable to receive solar energy;
   an external heater operable to provide secondary thermal energy;
   an engine disposed in communication with the solar collector and the external heater, the engine operable to:
      receive the solar energy from the solar collector,
      receive the secondary thermal energy from the external heater, and
      convert the solar energy and the secondary thermal energy to mechanical energy; and
   a controller in communication with the solar collector, the engine, and the external heater, the controller operable to:
      restrict the solar collector to heating the engine to a first predetermined temperature; and
      actuate the external heater to heat the engine from the first predetermined temperature to a second predetermined temperature.

2. The system of claim 1, wherein the external heater provides the secondary thermal energy via combustion of an external fuel.

3. The system of claim 1, wherein the external heater is a gas burner.

4. The system of claim 1, wherein the engine comprises a Stirling Engine.

5. The system of claim 1, wherein the controller is operable to switch the external heater to an OFF state until the engine reaches the first predetermined temperature.

6. The system of claim 5, wherein the first predetermined temperature is in a range of about 600 degrees Celsius to 800 degrees Celsius.

7. The system of claim 1, wherein the controller is operable to switch the external heater to an ON state if the engine reaches the first predetermined temperature.

8. The system of claim 1, wherein the controller is operable to maintain the solar collector at the first predetermined temperature.

9. The system of claim 1, wherein the controller is operable to adjust the position of the solar collector relative to the sun.

10. A system for converting thermal energy into mechanical energy, the system comprising:
    a collector operable to collect solar energy;
    a external heater operable to provide secondary thermal energy; and
    an engine disposed in communication with the collector and the external heater, the engine operable to receive the solar energy and the secondary thermal energy to produce mechanical energy, wherein the collector is restricted to heating the engine to a first predetermined temperature and to being maintained at the first predetermined temperature.

11. The system of claim 10, wherein the external heater is operable to heat the engine from the first predetermined temperature to a second predetermined temperature.

12. The system of claim 11, wherein the first predetermined temperature is in a range of about 600 degrees Celsius 800 degrees Celsius, and the second predetermined temperature is in a range of about 800 degrees Celsius to 1000 degrees Celsius.

13. The system of claim 10, wherein the external heater provides the secondary thermal energy via combustion of an external fuel.

14. The system of claim 10 further comprising a controller coupled to the collector, the external heater, and the engine.

15. The system of claim 14, wherein the controller is operable to switch the external heater to an ON state if the engine reaches the first predetermined temperature.

16. The system of claim 10, wherein the first predetermined temperature depends on an amount of solar energy available.

17. A method for producing mechanical energy with a Stirling Engine, the method comprising:
    receiving solar energy via a solar collector coupled to the Stirling Engine;
    receiving secondary thermal energy via an external heater coupled to the Stirling Engine;
    sensing, by a controller, an operating temperature of the solar collector;
    restricting, by the controller, the operating temperature of the solar collector to a first predetermined temperature;
    maintaining, by the controller, the operating temperature of the solar collector at the first predetermined temperature; and
    converting the solar energy and the secondary thermal energy into mechanical energy.

18. The method of claim 17 further comprising heating the Stirling Engine to the first predetermined temperature with the solar energy.

19. The method of claim 18 further comprising heating the Stirling Engine from the first predetermined temperature to a second predetermined temperature with the secondary thermal energy.

20. The method of claim 17, wherein the external heater is a gas burner.

* * * * *

UNITED STATES PATENT AND TRADEMARK OFFICE
CERTIFICATE OF CORRECTION

| | | |
|---|---|---|
| PATENT NO. | : 8,596,060 B2 | Page 1 of 1 |
| APPLICATION NO. | : 12/474998 | |
| DATED | : December 3, 2013 | |
| INVENTOR(S) | : Umesh N. Gandhi | |

It is certified that error appears in the above-identified patent and that said Letters Patent is hereby corrected as shown below:

In the Specification
In Column 1, line 28, delete "collector" and insert --collect--.
In Column 2, line 33, insert --a--, after the word for.
In Column 3, line 60, delete "150" and insert --140--.

Signed and Sealed this
Fourth Day of March, 2014

Michelle K. Lee
*Deputy Director of the United States Patent and Trademark Office*